E. F. STEPHENS.
SUBSOIL PLOW.
APPLICATION FILED FEB. 15, 1912.
1,103,446.
Patented July 14, 1914.
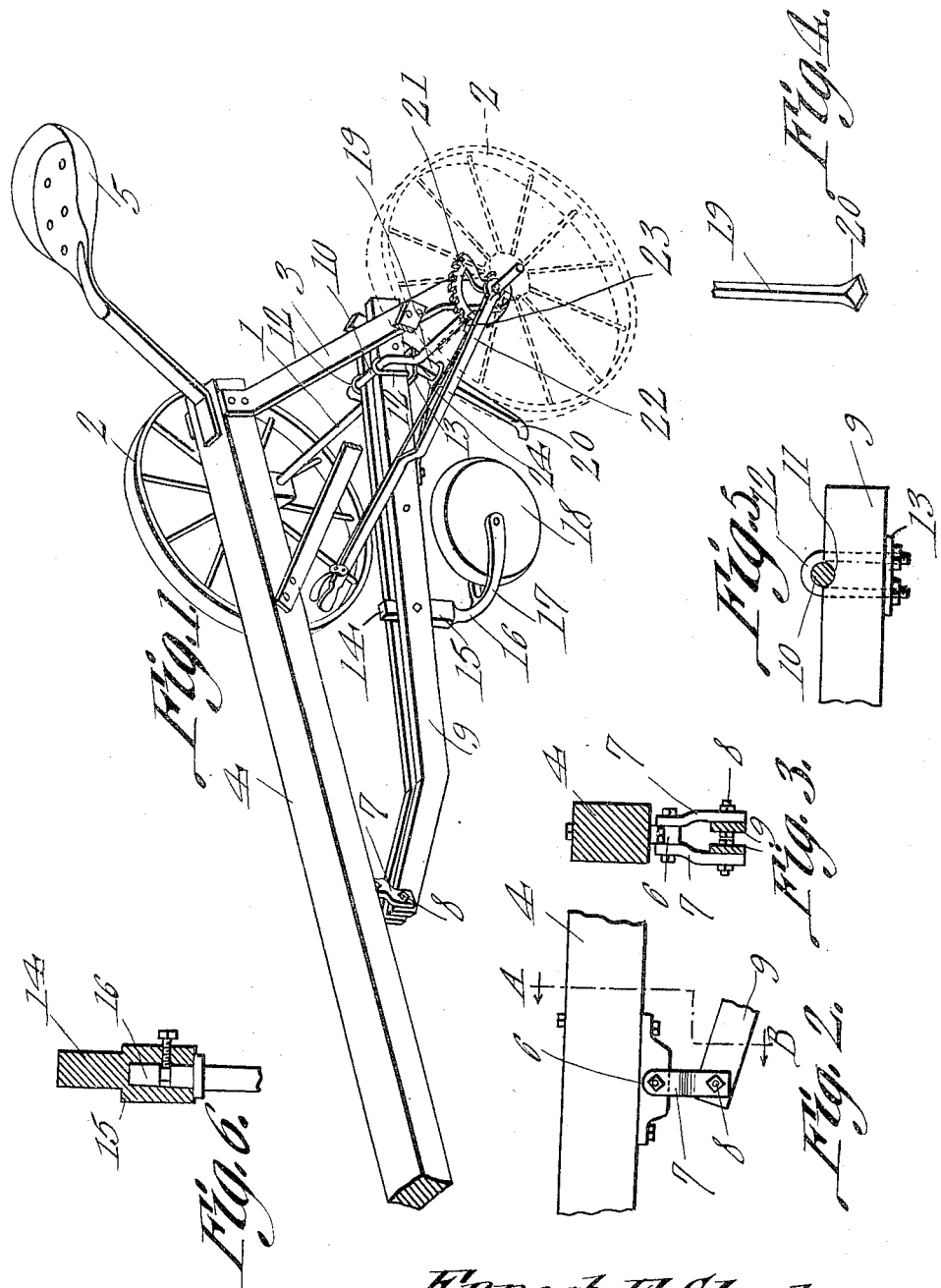
Witnesses
Ernest F. Stephens,
Inventor
by C. A. Snow & Co.
Attorneys

UNITED STATES PATENT OFFICE.

ERNEST F. STEPHENS, OF HAWESVILLE, KENTUCKY.

SUBSOIL-PLOW.

1,103,446.

Specification of Letters Patent.  Patented July 14, 1914.

Application filed February 15, 1912. Serial No. 677,671.

*To all whom it may concern:*

Be it known that I, ERNEST F. STEPHENS, a citizen of the United States, residing at Hawesville, in the county of Hancock and State of Kentucky, have invented a new and useful Subsoil-Plow, of which the following is a specification.

This invention relates to sub-soil plows, its object being to provide a simple and durable structure of this type for loosening the sub-soil, the same being particularly useful in working sod covered and low moist soil.

Another object is to provide a structure of this type which can be used by itself as a complete machine or which can be attached to different types of machines such as corn stalk cutters and the like.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—Figure 1 is a perspective view of the machine. Fig. 2 is an enlarged side elevation showing the connection between the adjustable beam and the main or draft beam. Fig. 3 is a section on line A—B Fig. 2. Fig. 4 is a rear elevation of the shovel. Fig. 5 is a side elevation of the rear portion of the pivoted beams and showing the crank in section. Fig. 6 is an enlarged section through the block adapted to be connected to the pivoted beams and showing a portion of the stem swiveled within the block.

Referring to the figures by characters of reference 1 designates a crank axle supported by wheels 2 and having upwardly converging side members 3 loosely engaged thereby and secured, at their upper ends, to the rear end portion of the draft beam 4 of the structure. This beam preferably supports a seat 5. A bracket 6 is secured to the lower face of the beam 4 at a point in front of the axle 1 and has a pair of spaced links 7 pivotally connected to it and converging downwardly, these links engaging a bolt 8 which extends transversely through the front ends of parallel beams 9. The front end portions of these beams 9 are preferably inclined upwardly toward the links and the rear end portions of the beams 9 extend across the crank 10 of the axle 1, there being notches 11 in the upper edges of the beams 9 and in which the crank 10 is fitted. The crank is held in these notches by U-bolts 12 located along the outer sides of the beams 9 and secured within a plate 13 extending under the beams.

The reduced upper end 14 of a block 15 is secured between the beams 9 at a point between the ends thereof and swiveled within the lower end of the block 15 is a stem 16 curved rearwardly and forked, as shown at 17. A colter or cutting disk 18 is journaled in the forked portion 17 of the stem.

The standard 19 of a shovel 20 is secured between the rear end portions of the beams 9 and directly in rear of the disk 18, the shovel 20 being preferably inclined forwardly and downwardly as shown.

A toothed segment 21 is connected to one of the side members 3 and is concentric with the axle 1, there being a lever 22 fixedly connected to one end portion of the axle and carrying a spring controlled pawl 23 which normally engages the segment so as to thus hold the axle 1 against rotation within the members 3.

It will be apparent that when the machine is drawn forward the disk 18 will cut into the soil, thus forming a path for the shovel 20 which engages the sub-soil and loosens it. The depth of the cut can be regulated by rotating the axle 1 within the wheels 2 thereby to swing the crank 10 downwardly or upwardly and cause the lower ends of the beams 9 to be lowered or raised. After the desired adjustment has been effected, pawl 23 is permitted to engage the segment 21 so that the crank 10 cannot shift out of proper position.

As shown in Fig. 1 a brace rod 24 may be secured to the standard 19 and to the beams 9.

While the sub-soiler has been shown and described as a complete machine, it is to be understood that, if desired, the block 6, can be connected to the beam of a stalk cutter or other suitable machine and the beams 9 can be connected to the axle of the machine. Thus the sub-soiler can be used as an attachment and the crank axle 1, wheels 2 and beam 4 can be dispensed with.

What is claimed is:—

The combination with supporting wheels, and an axle mounted for rotation therein and having a central crank normally extending upwardly from the axle, of a draft beam, means for connecting the draft beam to the axle and supporting said beam, a plow beam connected to the draft beam and constantly extending under the crank portion of the axle, the sides of said crank portion constituting means for holding the plow beam against lateral movement relative to the axle, said plow beam being pivotally connected to the crank, a lever secured to the axle for rotating it, and a toothed segment fixedly mounted adjacent and concentric with the axle and constituting means for holding the axle and lever against rotation, said axle being revoluble to raise and lower the plow beam, independently of the draft beam.

In testimony that I claim the foregoing as my own, I have hereto affixed my signature in the presence of two witnesses.

ERNEST F. STEPHENS.

Witnesses:
M. T. MASTON,
W. S. THOMAS.

Copies of this patent may be obtained for five cents each, by addressing the "Commissioner of Patents, Washington, D. C."